United States Patent [19]

Masaki et al.

[11] 4,107,786

[45] Aug. 15, 1978

[54] CHARACTER SIZE CHANGING DEVICE

[75] Inventors: Katsumi Masaki, Kodaira; Yukio Inagi, Isaka, both of Japan

[73] Assignee: Canon Kabushiki Kaisha, Tokyo, Japan

[21] Appl. No.: 771,468

[22] Filed: Feb. 24, 1977

[30] Foreign Application Priority Data

Mar. 1, 1976 [JP] Japan ................................. 51-21911

[51] Int. Cl.² .......................... G06F 3/12; G06F 3/14
[52] U.S. Cl. .................................... 364/900; 178/30; 340/324 AD
[58] Field of Search ... 364/900 MS File, 200 MS File; 340/324 AD, 324 A, 146.3 H; 178/30

[56] References Cited

U.S. PATENT DOCUMENTS

| | | | |
|---|---|---|---|
| 3,402,395 | 9/1968 | Culler et al. ........................ 364/900 |
| 3,521,241 | 7/1970 | Rumble ............................... 364/900 |
| 3,599,178 | 8/1971 | Jackson et al. ............. 340/324 AD X |
| 3,614,767 | 10/1971 | Carrell ..................... 340/324 AD X |
| 3,659,283 | 4/1972 | Ophir ...................... 340/324 AD X |
| 3,686,631 | 8/1972 | Elliott ...................... 340/146.3 H |
| 3,921,148 | 11/1975 | Ophir et al. ........................ 364/200 |
| 3,928,845 | 12/1975 | Clark ............................ 340/324 AD |
| 3,991,868 | 11/1976 | Robinson et al. ......... 340/324 AD X |
| 4,007,442 | 2/1977 | Findley et al. ...................... 364/900 |
| 4,020,462 | 4/1977 | Morrin ..................... 340/146.3 H X |

OTHER PUBLICATIONS

Holderness, "Generation of Double Size Characters" in *IBM Tech. Discl. Bull.*, vol. 13, No. 9, Feb. 1971, pp. 2792-2793.

*Primary Examiner*—Melvin B. Chapnick
*Attorney, Agent, or Firm*—Fitzpatrick, Cella, Harper & Scinto

[57] ABSTRACT

A signal converter for use in a recording or displaying device which can be used to change the size of characters to be recorded or displayed. By using instruction signals or enlargement codes, a part (for example the upper or lower half) of a character field and hence a corresponding part of a character may be enlarged, and then the enlarged upper and lower halves are combined to form an enlarged character for recording or display. Any number of characters in a row of characters may be changed in size by using the signal converter, and specified portions of different characters may be enlarged and then combined.

23 Claims, 17 Drawing Figures

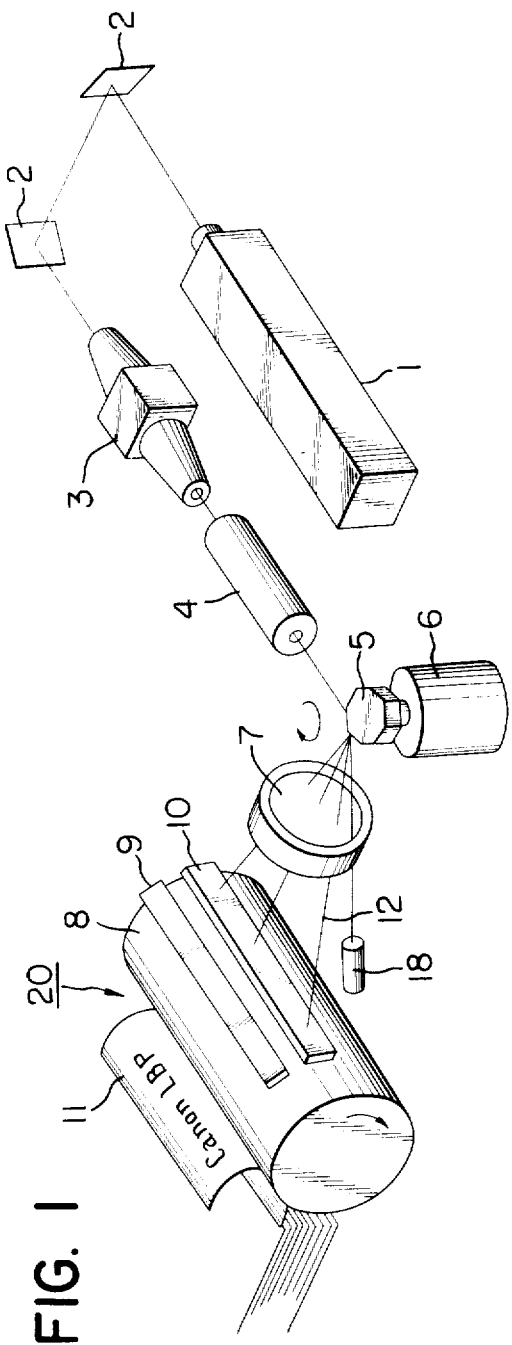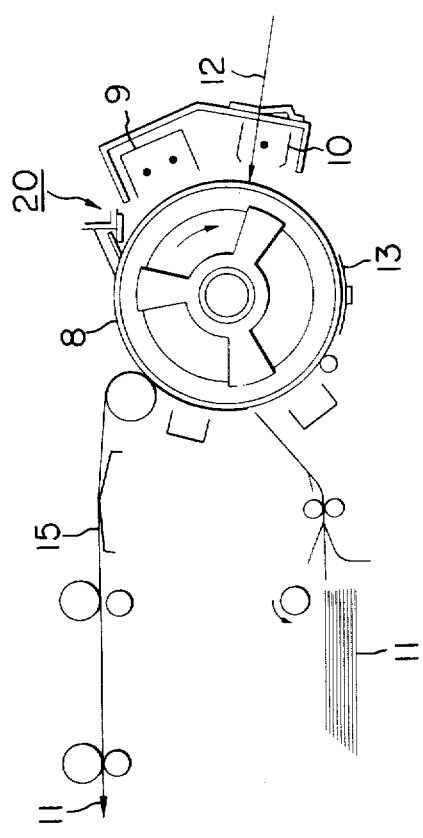

CHARACTER SIZE CHANGING DEVICE

BACKGROUND OF THE INVENTION

1. Field of the Invention

The present invention relates to a signal converter for use in a recording or display device for suitably processing information signals representative of characters so that characters will be recorded or displayed with their size enlarged or reduced to a desired extent.

2. Description of the Prior Art

In general, with conventional impact type line printers used for data output from computers or the like it is impossible to change the size of characters to be recorded. Therefore, in order to change the size, many types in different sizes must be provided. In addition, the printing positions cannot be changed arbitrarily. Thus the conventional impact type line printers lack latitude and are insufficient in operation.

However, with the laser beam printers of the type wherein raster scanning is affected as well as multi-stylus electrostatic printers and CRT display devices, the size of characters to be recorded or displayed may be changed by suitably stepping down the frequencies of timing clocks for the main and auxiliary scannings thereby changing the read-out time from a character generator which is a character or symbol source. However, such devices have the disadvantage that all of the characters on one line must be changed of the same size so that it is impossible to change the size of only one or several desired characters on a line.

To solve this problem, there has been invented and demonstrated a system wherein, as disclosed in detail in Japanese Patent Laid-Open No. 104834/1975, a coded signal (which is interchangeably referred to as "a character code "or" an information signal" in this specification) of a character to be recorded or displayed in enlarged size includes a code for designating the enlargement of this character and addresses which addresses the enlarged character will occupy.

More particularly, assume that a character be enlarged both lengthwise and widthwise. In coding, two character codes representing the same character and each including an enlargement signal or code (which is also referred to as "an information signal" this specification) are arrayed in both lengthwise and widthwise so that the desired character may be enlarged at a position corresponding to the addresses included in the character codes. Therefore according to this system, the enlarged character extends over two lines so that in addition to recording or displaying characters in one line, enlargement of a desired character over two lines must be accomplished. As a result, a control circuit therefor is extremely complex in construction. Furthermore, the addition of the enlargement code to a character code results in the increase in bits used, and the increase in bits used in each character code results in an increase in the dimensions of the system. Conversely the dimensions of the system impose a limit to the number of character codes which permit the enlargement of characters in recording or displaying.

SUMMARY OF THE INVENTION

In view of the above, one of the objects of the present invention is to provide a signal processor or converter which may substantially solve the problems encountered in the case of the change in size of characters to be printed or displayed by the prior art recording or display devices and which may permit the change in size of characters to be printed or displayed in a very simple fashion.

Another object of the present invention is to provide a signal processor or converter which may permit the change in size of any arbitrary part of a character to be recorded or printed by an instruction or enlargement code designating the output of a part of the character code corresponding to a desired part of the character to be changed in size.

A further object of the present invention is to provide a signal processor or converter which may easily permit the change in size of a character to be recorded or displayed.

The above and other objects, features and advantages of the present invention will become more apparent from the following description of the preferred embodiments thereof taken in conjunction with the accompanying drawings.

BRIEF DESCRIPTION OF THE DRAWINGS

FIG. 1 is a diagrammatic view of a laser beam printer to which is applied the present invention;

FIG. 2 is a schematic sectional view of a developing section of the printer shown in FIG. 1;

FIGS. 5 and 6 are views used for the explanation of the underlying principle of the enlargement of a character in accordance with the present invention;

FIGS. 7 and 8 show the array of character codes and enlargement codes corresponding to the array of characters to be recorded or displayed shown in FIG. 6;

FIG. 14 is a view used for the explanation of the enlargement of successive characters according to the present invention;

FIG. 15 shows an array of character and instruction codes corresponding to the array of characters shown in FIG. 14;

The same reference numerals are used to designate similar parts throughout the figures.

DESCRIPTION OF THE PREFERRED EMBODIMENTS

Underlying Principle

Figure 3:
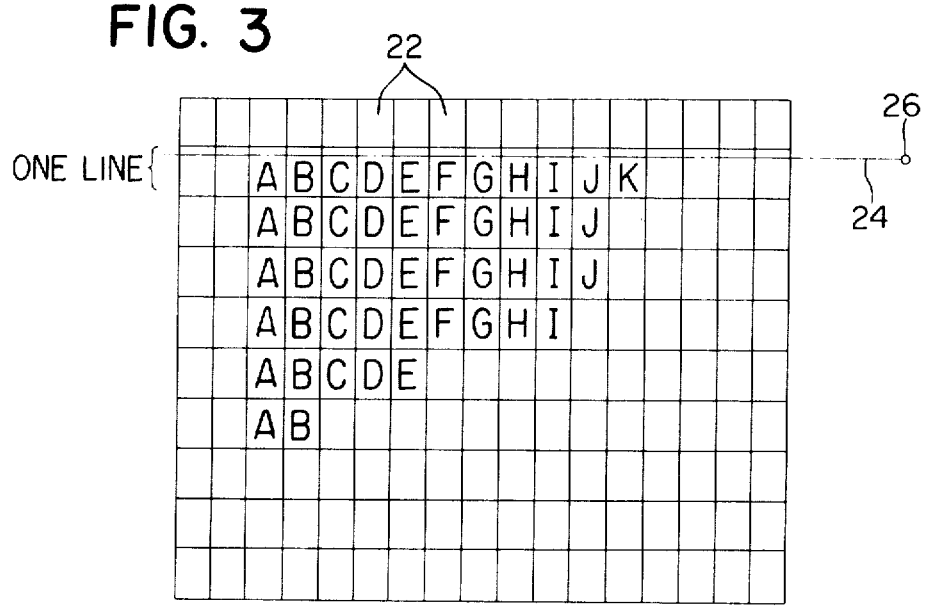
FIG. 3 is a view used for the explanation of recording made by the laser beam printer.

According to the present invention, in order to enlarge both lengthwise and widthwise a character to be recorded or displayed, no special code for designating the enlargement of a character is used, but two kinds of codes (for instance EBCDIC) are used in such a way that blank codes such as :31 and :32 are placed in front of or behind a character to be enlarged. The character behind or in front of the code :31 is therefore so modified or converted that only the upper half section of the character is doubled in size in both lengthwise and widthwise directions, whereas the character behind or in front of the code :32 is so modified or converted that only the lower half section is doubled in size in both lengthwise and widthwise directions. Therefore upon completion of the scanning of two lines, the character will be displayed or recorded as being twice the size in both lengthwise and widthwise.

In the preferred embodiments of the present invention, the signal converter will be described as applied to a laser beam printer of the type disclosed in copending U.S. application No. 616,675, now U.S. Pat. No. 4,059,833, issued Nov. 22, 1977, and assigned to the same assignee. The construction and mode of operation of the laser beam printer will therefore be described briefly with reference to FIGS. 1 and 2.

First referring to FIG. 1, the laser beam emitted from a laser 1 is redirected by reflectors 2 to be incident to a modulator 3. Since the reflecting mirrors 2 are inserted in order to reduce the dimensions of the laser beam printer, they may be eliminated if the dimensions of the printer present no problem at all. The modulator 3 consists of a conventional acousto-optical element or electro-optical element so that the laser beam intensity is modulated by the input signal applied to the modulator 3.

If the laser 1 consists of a semiconductor laser or a gas laser capable of electric current modulation or a laser incorporating a modulator, the modulator 3 may be eliminated and the laser beam may be directly made incident to a beam expander 4.

The laser beam from the modulator 3 is expanded in diameter by the beam expander 4 without its coherence being adversely affected, and the expanded laser beam is made incident to a rotary polyhedral mirror 5 with one or more reflecting mirrors. The mirror 5 is carried by a shaft which in turn is supported by extremely high precision bearings such as air bearings and is rotated at a constant rotational speed by a motor 6 such as a hysteresis synchronous motor or DC servometer so that the laser beam 12 is scanned in the horizontal direction to be incident on a focusing lens 7 with $f$-$\theta$ characteristic so that the laser beam may be focused as a light spot on a photosensitive drum 8.

A laser beam detector 18 consists of an incidence slit with its width very small and a photoelectric transducer such as a PIN diode having a quick response. It detects the laser beam 12 which is swept to a predetermined position. In response to the output signal from the laser beam sensor 18, the application of input signals to the modulator 3 is initiated. Therefore the error in the equiangularity of the reflecting mirrors or surfaces of the rotary mirror 5 and the out of phase in the horizontal direction of the signal due to the variation in rotational speed of the mirror 5 may be sufficiently compensated so that the dimensional accuracies imposed on the rotary mirror 5 and motor 6 will be tolerated to a greater extent. Consequently they may be fabricated at less cost.

The application of input signals to the modulator 3 is made in synchronism with the vertical synchronous signals which are generated based on the rotational speed of the drum 8 or the recording sheet feeding timing, so that uniform left and right margins may be obtained.

The laser beam 12 which has been deflected and modulated in the manner described above is made incident on the photosensitive drum, and the focused character patterns are visualized by the conventional electrophotographic process and transferred onto an ordinary paper sheet as will be described in detail hereinafter.

Next referring to FIG. 2, a printing section generally indicated by reference numeral 20 will be described. It employs, for instance, an electrophotographic process as disclosed in U.S. Pat. No. 3,666,363 assigned to the same assignee. The photosensitive drum 8 consists of an electrically conductive support member, a photoconductive layer and an insulating layer, and prior to the exposure, the insulating layer is previously positively or negatively charged uniformly by a first corona charger 9 so that the charge opposite in polarity to that on the insulating layer may be trapped in the interface between the insulating layer and the photoconductive layer or within the photoconductive layer. Thereafter, simultaneous with the exposure to the laser beam 12, AC corona discharge is imparted by an AC corona discharger 10 upon the positively or negatively charged insulating layer so that an electrostatic latent image will be formed, the high and low potential pattern of the image being corresponding to the light and dark pattern focused by the laser beam 12. Thereafter the insulating layer may be uniformly exposed to light so that a high contrast electrostatic image will be formed, and then the image is developed by a developing device 13 with a developing agent mainly consisting of electrically charged colored pigment particles. The developed image is transferred onto a recording sheet by utilizing the interior or exterior electric field and is fixed by a fixing device 15 consisting of an infrared lamp or heating plates, whereby a copy is reproduced. Thereafter the insulating layer of the drum 8 is cleaned by a cleaning device for the next reproduction process.

In FIG. 3 there is shown the information on one page which is to be recorded on the recording sheet 11, and each character is contained in each character area or field 22. A flying spot 26 is swept both horizontally and vertically or main and auxiliary scanning directions. Therefore, the coded signals which are applied to the modulator 3 are stored in a memory substantially in the same form or array as shown in FIG. 3. This is, the coded signals for respective characters are arrayed similar to the corresponding characters arrayed in respective character areas 22, and the modulator 3 molulates the laser beam in response to the coded signals read out from the memory in the order shown in FIG. 3.

Figure 4:
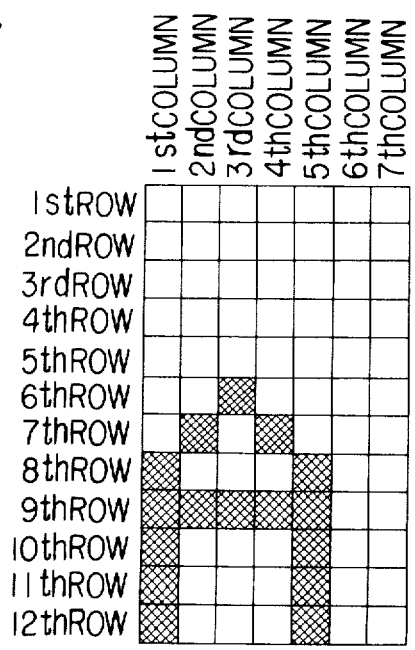
FIG. 4 shows a character field.

Each coded signal representing each character is converted by a character generator so that the character may be formed by 7 × 12 array of dots as shown in FIG. 4. It is evident therefore that the characters in one line will be recorded or displayed by twelve scannings from the first row to the 12th row.

Figure 5:
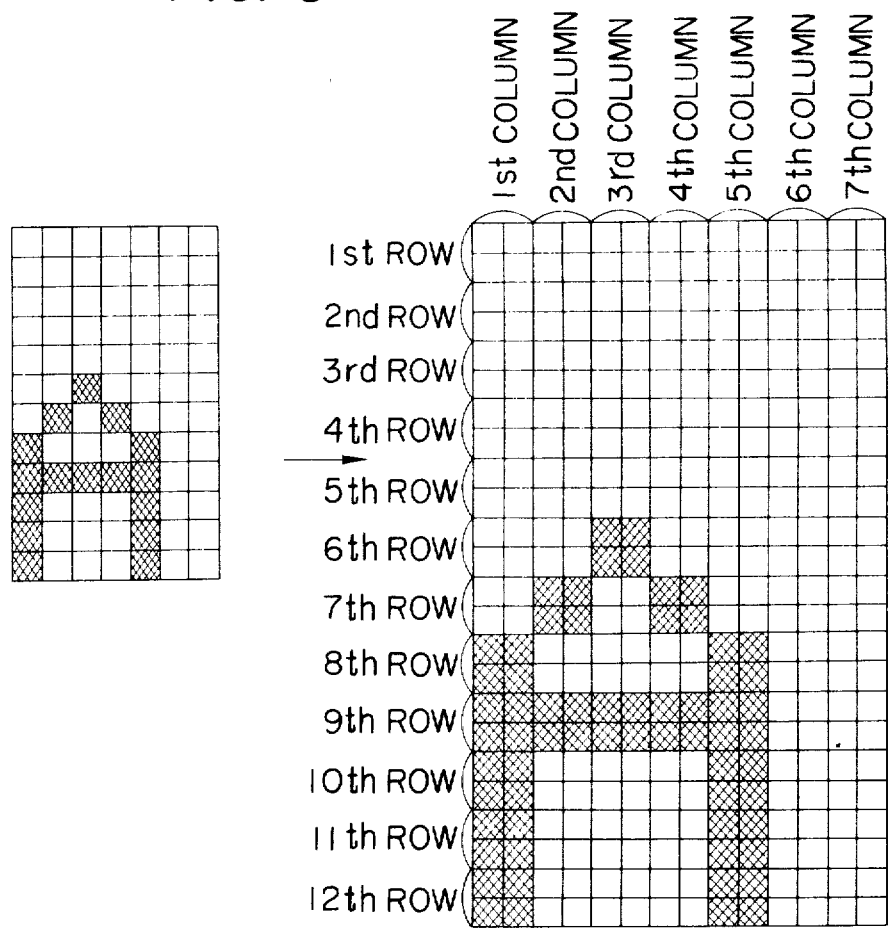

In FIG. 5 there is shown an enlarged character with the laser beam printer of the type described, the character size being doubled both lenghtwise (or in the direction of columns) and widthwise (or in the direction of rows). That is, each signal for generating a black elementary area shown in FIG. 4 is doubled in time or repeated twice both lengthwise and widthwise (or in both the column and row directions). In other words, the horizontal and vertical pattern read-out clocks which are derived from the character generator in synchronism with the horizontal and vertical scannings are halved in frequency so that the designated character will be enlarged both lengthwise and widthwise. However, according to this enlargement method, all of the characters in each line must be enlarged. That is, it is impossible to enlarge only a required character as described hereinbefore.

Figures 6, 7, 8:
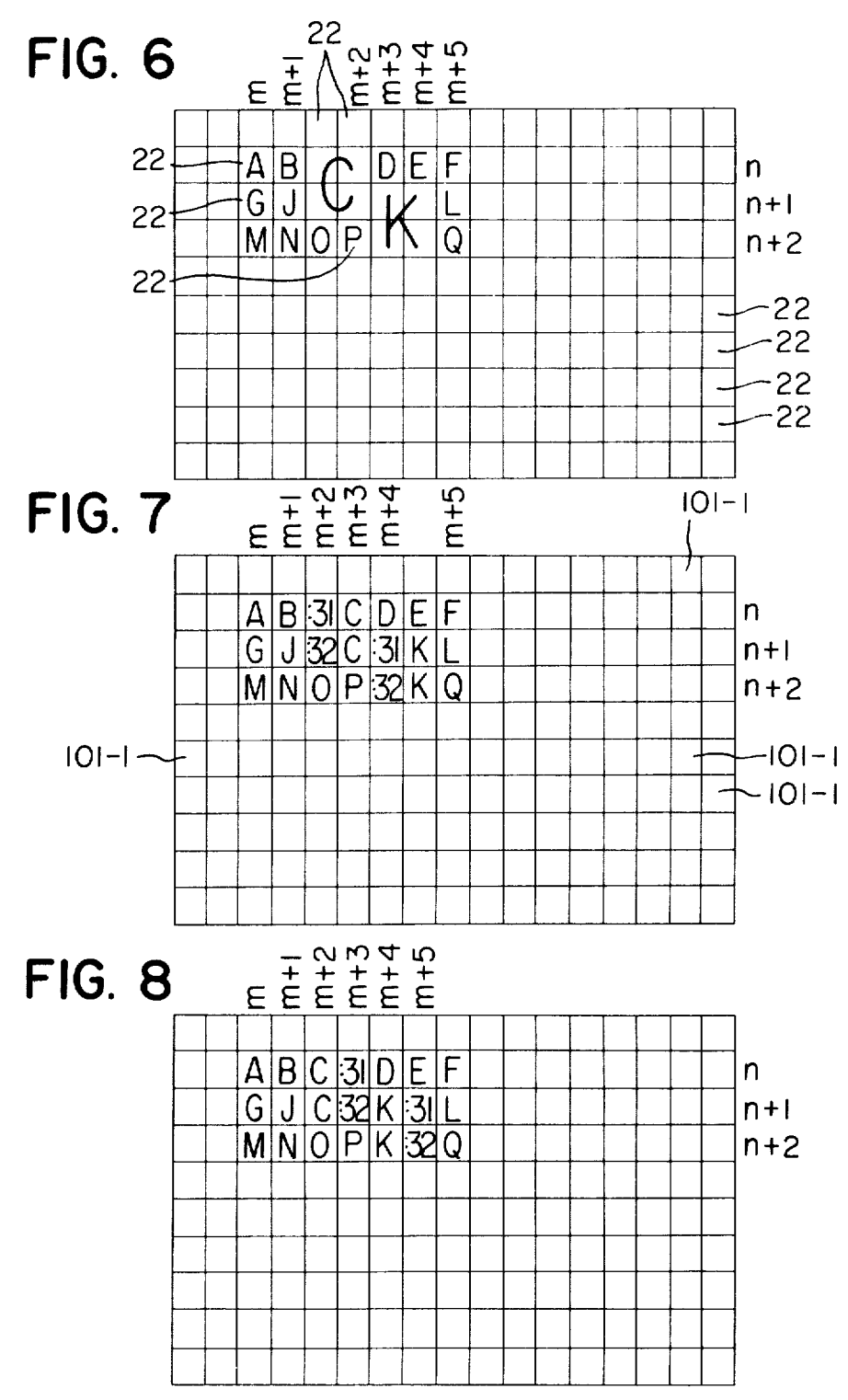
Figure 9:
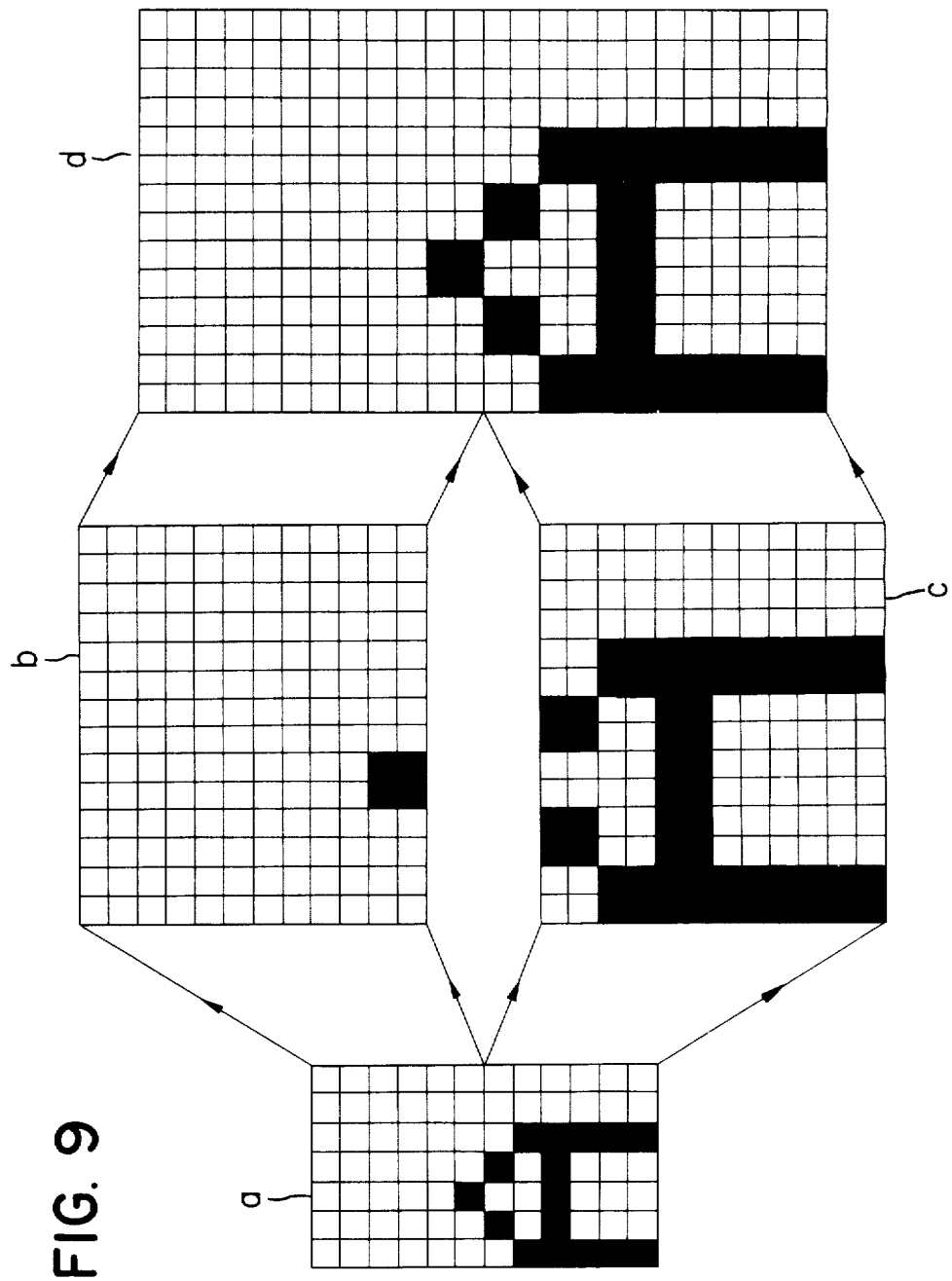
FIG. 9 is a view, enlarged in scale, of character fields used for the explanation of doubling the size of a character both lengthwise and widthwise according to the present invention.

However, according to the present invention, only a desired character such as c or k may be enlarged to occupy four or more character areas 22 as shown in FIG. 6 illustrating the whole information in one page to be recorded on the recording sheet 11 (See FIG. 2). For this purpose, the first enlargement code :31 for designating the enlargement of the upper half of the character or character area is placed in the character area in front of or behind the desired character c or k, whereas the second enlargement code :32 for designating the enlargement of the lower half of the character or character area is placed in the character area in front of or behind the character c or k which is desired to be enlarged, as shown in FIGS. 7 and 8. In practice, these first and second codes are stored in the addresses corresponding to the desired character areas. As shown in FIG. 9, in response to these first and second enlargement codes detected, the signal converter in accordance with the present invention operates to enlarge the upper and lower half sections of a desired character or character area as shown in FIGS. 9b and 9c, respectively, so that the combination of the enlarged upper and lower half sections results in a character of twice the length and width as shown in FIG. 9d. Since the first and second enlargement codes are stored in the locations corresponding to the character areas in the two adjacent lines respectively, any desired character in any line may be enlarged independently of other characters in the same line.

Figure 10:
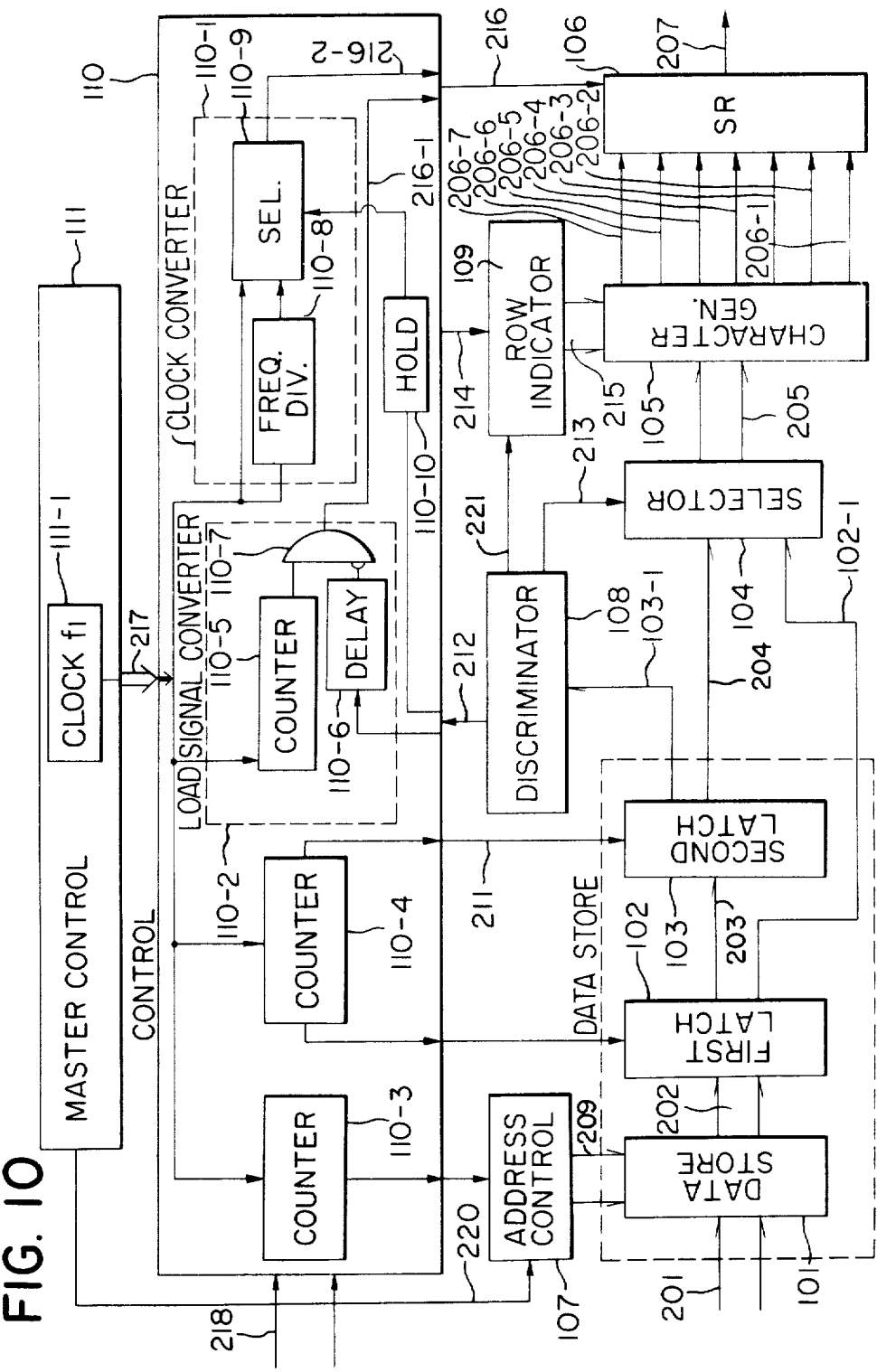
FIG. 10 is a block diagram of a first preferred embodiment of the present invention.
Figure 11:
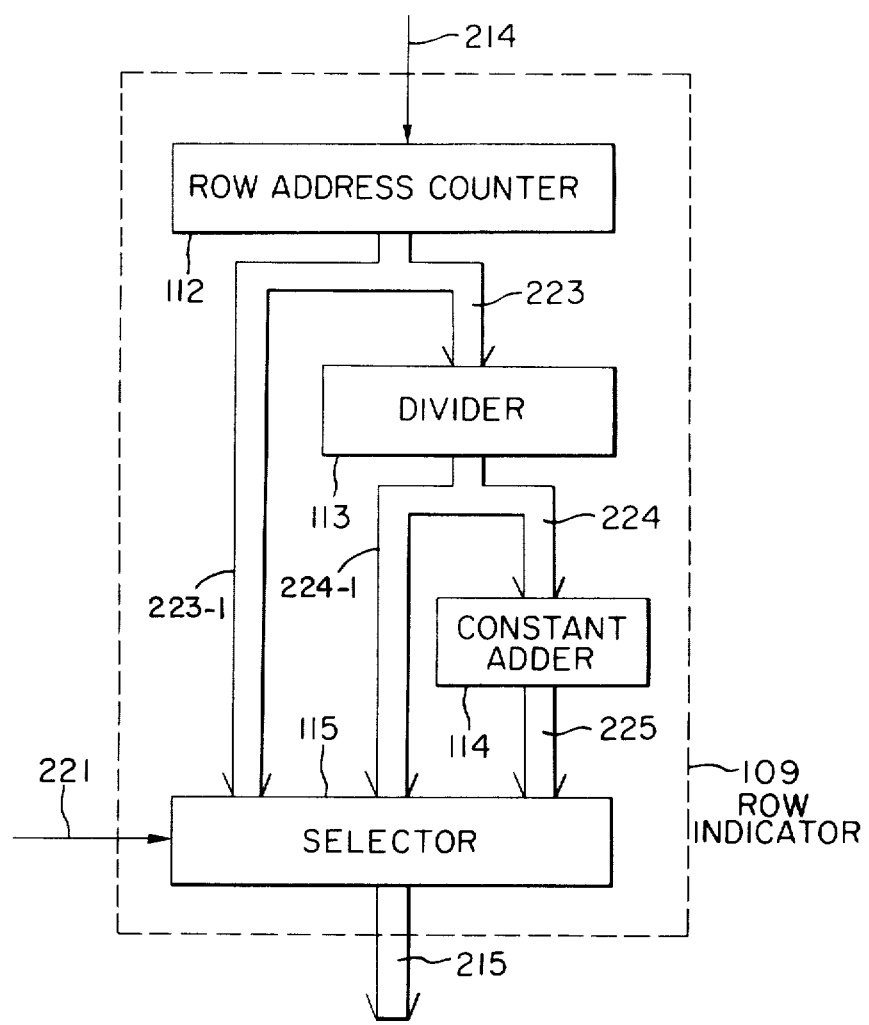
FIG. 11 is a block diagram illustrating in detail a row indicator 109 shown in FIG. 10.
Figure 12:
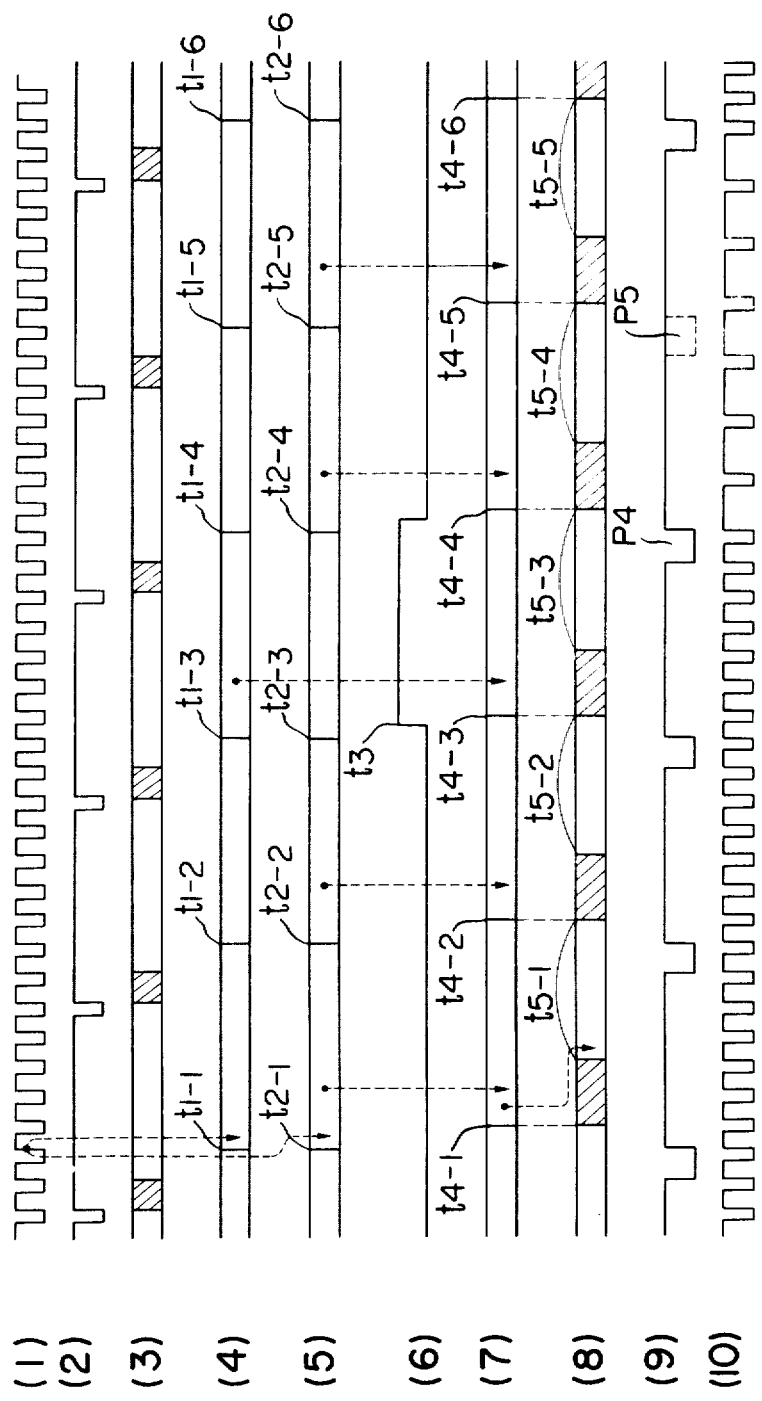
FIG. 12 is a timing chart used for the explanation of the mode of operation of the first embodiment shown in FIG. 10.

First Embodiment, FIGS. 10 through 12

In FIG. 10 there is shown as a block diagram a first preferred embodiment of a signal converter in accordance with the present invention. The character codes including the first and second enlargement codes of each page are transmitted through conductors 201 and stored in a data store 101 which may be any conventional random access memory with a desired access time and which is of the semiconductor type in the first embodiment. As shown in FIG. 7 or 8 the data store 101 has a plurality of storage areas 101—1 each storing one character or information code, or first or second enlargement code. That is, the code representative of the character A is stored in the storage area designated by the column $m$ and row $n$; that is, with the address $(n, m)$, the code representative of the character B, in the storage area with the address $(n, m+1)$, the first enlargement code :31, in the storage area with the address $(n, m+2)$, and so on. (In FIG. 7, small letters represent coded signals.) Therefore it is evident that the array of information and enlargement codes stored in the data store 101 corresponds to the array of characters in the character areas 22 shown in FIG. 6.

In FIG. 7 the upper enlarged half of the character C occupies the two succeeding character areas with the addresses $(n, m+2)$ and $(n, m+3)$, whereas the lower enlarged half, the two succeeding character areas with the addresses $(n+1, m+2)$ and $(n+1, m+3)$. Therefore in order to establish a one-to-one correspondence between the upper and lower enlarged halves and the codes stored in the data store 101, the first enlargement code: 31 is stored in the storage area with the address $(n, m+2)$ and the character code C, in the succeeding area with the address $(n, m+3)$, whereas the second enlargement code: 32, in the storage area with the address $(n+1, m+2)$ and the character code C, in the succeeding storage area with the address $(n+1, m+3)$.

Referring back to FIG. 10, an address control 107 which is connected through conductors 209 to the data store 101 designates the address of a code to be stored in or read out from the data memory 101 and controls the storage or read-out timing. More particularly, in response to the signal transmitted through a conductor 220 from a master control unit 111 to be described hereinafter the address control 107 controls the data storage into or data read-out from the data store 101. In response to a read-out instruction, a read-pulse generator 110—3 consisting of a pulse counter transmits one read pulse every seven basic clock pulses (See FIGS. 12(1) and 12(2)) to the address control 107 to read out the code from the designated storage area.

The outputs from the data store 101 are transmitted in parallel through conductors or output lines 102 to a first latch 202 adapted to latch the coded signal (consisting of $l$ bits) representing one character. That is, a latch control circuit, i.e. counter 110—4, which is included in a control circuit 110, generates and transmits one latching pulse for every seven basic clock pulses (See FIG. 12(1)) to the first latch 102 so that the latter latches the one coded signal at a time $t$-1 (See FIG. 12(4)) for a time equal to seven basic clock pulses (corresponding to a number of columns of one character field). During this latching interval, the first latch 102 (that is, a first storage means) delivers the character code in parallel through transmission lines 203 and 102-1 to a second latch 103 and a selector 104.

The mode of operation of the second latch 103 is substantially similar to that of the first latch 102. That is, in response to the latching pulse transmitted through a conductor 211 from the latch control 110-4, the one character code delivered from the first latch 102 is latched in the second latch 103 while the first latch 102 is delivered with the succeeding character code from the data store 101.

The output from the second latch 103 is delivered in parallel through data transmission conductors 204 and 103-1 to the selector 104 and a discriminator 108.

The discriminator 108 has a function of discriminating whether the output code delivered from the second latch 103 is the character code or the enlargement code, and consists of a comparator adapted for comparing the output data delivered from the second latch 103 through the transmission line 103-1 with the enlargement code [:31] or [:32] transmitted from an enlargement code generator. The output from the discriminator 108 (See FIG. 12 (6)) appears on conductors 212, 213 and 221.

In response to the output signal from the discriminator 108 transmitted through the conductor 213, the selector 104 makes the decision whether the output from the second latch 103 or the output from the first latch transmitted through the conductor 102-1 is delivered to a character generator 105 through conductors 205. More particularly, if the output from the discriminator 108 represents the detection of the enlargement code, the selector 104 delivers the output from the first latch 102 to the character generator 105, but if the output does not represent the detection of the enlargement code, the selector delivers the output from the second latch 103 to the character generator 105.

The character generator 105 which is also referred to as "the pattern signal generating or output means" responds to both the output delivered through the conductor 205 from the selector 104 and the output delivered through conductors 215 from a row indicator 109 to be described in detail hereinafter to deliver in parallel through conductors 206 to a shift register 106 seven row-dot signals (each logical "0" or "1") in response to which the dots are arrayed to form the character represented by the output code delivered from the selector 104.

The row indicator 109 which is also referred to as "the row indication signal generating means" includes a modulo-12 counter for counting the horizontal synchronous pulses delivered through conductors 218 and 214 and resetting after having counted twelve rows, the horizontal synchronous pulses or signals being generated, for instance, in response to the output from the beam detector 18 shown in FIG. 1.

Referring to FIG. 11, the row indicator 109 will be described in more detail hereinafter. It comprises a row address counter 112 for determining a row address in the character generator 105 when no enlargement is effected. That is, the row address counter 112 counts the horizontal synchronous pulses from 0 to 11 and resets after having counted the eleventh pulse. That is, the counter 112 is a modulo-12 counter. The row indicator 109 includes a divider or first arithmetic operation means 113 which divides the output from the counter 112 on signal lead 223 by two so that a row address will be counted up every time when two horizontal synchronous pulses are applied. In general, the row address counter 112 is of the binary type such that the division of the output 223 from the counter 112 by two may be accomplished by shifting the output 223 to the right by one place. In the first embodiment it is assumed that a decimal fraction of the quotient be not delivered.

A constant adder or second operation means 114 is adapted to add a constant (6 in this embodiment); that is, one half of a number of rows to the output from the divider 113 delivered through a conductor 224.

The outputs from the row address counter 112, the divider 113 and the constant adder 114 are delivered to a selector 115 through conductors 223-1, 224-1 and 225, respectively. As described above, the output represents whether the code latched in the second latch 103 is the character code or the first or second enlargement code is delivered through the conductor 221 to the selector 115. Therefore in response to the output representing the character code, the output from the row address counter 112 delivered through the conductor 223-1 is selected to appear on an output conductor 215 which is an output line of the row indicator 109. In response to the output representing the first enlargement code designating the enlargement of the upper half section of a character or character area, the output from the divider 113 delivered through the conductor 224-1 is selected to be delivered through the output conductor 215. In like manner, when the output represents the second enlargement code designating the enlargement of the lower half section, the output from the constant adder 114 is delivered through the output conductor 215.

Referring back to FIG. 10, the shift register 106 which is also referred to as "the parallel-serial means" receives the parallel outputs or seven dot signals from the character generator 105 through the conductors 206 in response to a load pulse signal (See FIG. 12(9)) and transmits the dot signals in a serial fashion on a conductor 207 in response to shift pulses (See FIG. 9(10)). The load pulses are transmitted through conductors 216-1 and 216 whereas the shift pulse signals, through conductors 216-2 and 216. In response to the basic clock pulses from a clock 111-1 in the master control 111, a load pulse signal converter 110-2 generates the load pulses. The converter 110-2 has a modulo-7 counter 110-5 for generating one pulse for every seven basic clock pulses as shown in FIG. 12(9), a delay circuit 110-6 for delaying the output from the discriminator 108 for a seven-clock-pulse period and an AND gate 110-7 to which are applied the outputs from the counter 110-5 and the delay circuit 110-6. When the output from the discriminator 108 does not represent the detection of the enlargement code, one load pulse is generated for every seven basic clock pulses, but when the enlargement code is detected no load signal is generated or transmitted not only for the seven-basic-pulse period during which the enlargement code is being detected but also for the succeeding seven-basic-clock pulse period.

The shift pulses are generated by a clock converter 110-1 in response to the basic clock pulses of a frequency $f$-1 from the clock 111-1 in the master control 111. The converter 110-1 consists of a frequency divider 110-8 for dividing the basic clock pulses by two into clock pulses at a frequency $f$-2 and a selector 110-9 to which are applied the basic clock pulses, the output from the frequency divider 110-8 and the output from the discriminator 108. That is, when the discriminator 108 detects the enlargement code, the selector 110-9 transmits the clock pulses at $f$-2 to the shift register 106 as the shift pulses. When the discriminator 108 does not detect the enlargement code, the selector 110-9 transmits the basic clock pulses at $f$-1 to the shift register 106. The output from the discriminator 108 is transmitted to the selector 110-9 through a hold circuit 110-10 adapted to be triggered by the trailing edge of the output pulse representing the detection of the enlargement code for holding the output for a 14-basic-clock pulse period.

The master control 111 transmits the control signals such as basic clock pulses to the control 110 through a conductor 217 and transmits the storage and read-out instructions to the address control 107 through a conductor 220.

Next the mode of operation of the first embodiment with the above construction will be described in conjunction with the coding system shown in FIG. 7. First under the control of the master control 111 delivered through the conductors 201 from an input source (not shown) and stored into the data store 101 are the data consisting of the character and enlargement codes of one page (for instance, data of 132 lines each containing 272 characters to be recorded on a page sized 210 × 297 mm$^2$.). The input source may be a magnetic tape or a host computer, and the address and timing controls are effected by the address control 107 as described hereinbefore. The data are stored as shown in FIG. 7 with character and enlargement codes stored in respective storage areas.

In response to the read-out instruction transmitted through the conductor 220 from the master control 111, the data stored in the data store 101 are read out. That is, under the control of the address control 107, the character or enlargement code is read out during a read-out time equal to seven basic clock pulses. For instance, assume that the enlargement code :31 at the storage area with the address (n, m+2) be read out. The read-out data is first latched in the first latch 102 and after one read-out time (equal to seven basic clock pulses) the character code C is read out from the storage area with the address (n, m+3) and is latched in the first latch 102 while the enlargement data is transferred to and latched in the second latch 103. The enlargement code is transmitted from the second latch 103 to the discriminator 108 and the selector 104 so that the enlargement code identification output signal appears on the output lines 212, 221 and 213. In response to this output signal the selector 104 selects the character code C latched in the first latch 102 and transmits it to the character generator 105. Simultaneously, in response to the output signal from the discriminator 108, the output from the divider 113 in the row indicator 109 (See also FIG. 11) is transmitted to the character generator 105.

Assume that the laser beam 12 is now scanning the character area at the address (n, 1) in FIG. 6. Then the content in the row address counter 112 is "0" so that the output from the divider 113 is also "0" (See FIG. 11). As a result, the signal "0" is transmitted through the conductor 215 to the character generator 105 so that seven column-dot pattern signals corresponding to the first row of the character field with the pattern "C" appear on the conductors 206-1 through 206-7.

The enlargement identification output is also transmitted through conductor 212 to the delay circuit 110-6 in the load pulse signal converter 110-2. Since the delay circuit 110-6 delays the transmission of the enlargement identification output signal for seven basic pulses, the output from the counter 110-5 is transmitted through AND gate 110-7 to the shift register 106 so that the output signals on the conductors 206-1 through 206-7 are stored in the shift register 106.

The enlargement identification signal is also transmitted to the hold circuit 110-10 so that the clock pulses at $f$-2 (that is, the basic clock pulses stepped down by 2) are applied as shift pulses to the shift register 106. Under these conditions, even when seven basic clock pulses have been counted, only 3.5 shift pulses have been applied to the shift register 106 so that only a half of its contents have been read out. However, the next character code D is transferred from the data store 102 and stored in the first latch 101 while the content in the latter is transferred into the second latch 103. Therefore the discriminator 108 now generates the character code identification output signal, and in response to this signal, the selector 104 selects the character code C in the second latch 103 and transmits it to the character generator 105. In response to the output signal from the discriminator 108 the row indicator 109 transmits the output from the row address counter 112 to the character generator through the conductors 215.

The character-code-identification output signal is also transmitted through the conductor 212 to the delay circuit 110-6 and the hold circuit 110-10, but they are still holding the enlargement code identification code so that the clock pulses at $f$-2 are kept being applied to the shift register 106. As a result, the pattern signals on the conductors 206-1 through 206-7 are not loaded into the shift register 106 and the read-out of the pattern signals which have been stored in the shift register 106 is continued. That is, the load signal is not permitted to be applied to the shift register 106 so that the pattern signal on the conductor 206 is not permitted to be loaded into the shift register 106, and the count-down clock pulses (or the clock pulses at $f$-2) are kept applied to the shift register 106. Therefore, during the succeeding 7 basic pulse period, the remaining pattern signals are read out.

Thereafter the next character code E is read out from the data store 102 and stored in the first latch 101 while the character code D in the first latch 101 is transferred into the second latch 103. The discriminator 108 generates the character code identification output signal so that the selector 104 delivers the character code in the second latch 103 on the conductors 205.

In response to the character-code-identification output signal from the discriminator 108 transmitted through the conductor 221 the row indicator 109 transmits the output from the row address counter 112 through the conductors 215 to the character generator 105. In response to the character code identification output signal transmitted through the conductor 212, the clock pulse converter 110-1 transmits the basic clock pulses at $f$-1 to the shift register 106 while the load pulse signal converter 110-2 transmits the load pulse signal to the register 106 through the conductor 216.

After the first row of the n-th line has been scanned in the manner described above, the scanning of the next rows is started. Assume that the enlargement code : 31 be stored in the second latch 103 while the character code C, in the first latch 102. Then the content in the row address counter 112 (See FIG. 11) is incrementally increased from 0 to 1, but the output from the divider 113 remains "0" because it does not deliver the quotient less than 1 as described hereinbefore. As a result, the signal on the conductor 224-1 remains "0" as in the preceding scanning, and consequently the character code C is read out in a manner substantially similar to that described above in conjunction with the scanning of the first row.

After the n-th line has been scanned 12 times in the manner described above, the characters which have not been designated to be enlarged are recorded in a predetermined size while the character which must be enlarged has its upper half doubled in size.

Next the scanning of the next line (n+1-th) is started. Assume that in the scanning of the first row the enlargement code :32 be read and stored in the second latch 103 while the character code C, in the first latch 102. Then enlargement-code (for designating the enlargement of the lower half section) identification output signal appears on the conductors 212, 213 and 221. In response to this output signal the row indicator 109 transmits the output from the constant adder 114 through the selector 115 and conductors 215 to the character generator 105. That is, the content in the row address counter 112 is "0" so that the output from the divider 113 is also "0" and consequently the output from the constant adder 114 is "0+6=6". Thus the signal "6" is transmitted through the conductor 215 to the character generator 105 so that the latter delivers the pattern signals in the seventh row of the character pattern C on the conductors 206.

In like manner, the codes shown in FIG. 7 are sequentially read out so that they are recorded as shown in FIG. 6. After the data of one page has been read out from the data store 101, that is, after the recording of one page has been accomplished, in response to the control signal new data are stored in the data store 101 or the same data are recorded again. For this purpose, the master control 111 delivers the control signals to the address control 107 and a timing controller 111.

In this manner the characters may be recorded in a predetermined size and at an enlarged scale in a very simple fashion.

FIG. 12 shows a timing chart of the operation of the first embodiment described above, the hatched area indicating a time interval during which the operation of the signal converter is not certain because the delay of signal transmission in an integrated circuit. The basic pulses shown at (1) are generated by the clock 111-1 in synchronism with the horizontal synchronous signals, and all of the operations are performed based on the basic clock pulses. The read-out pulses shown at (2) are generated one for each seven basic clock pulses by the counter 110-3 and applied to the address control 107 for controlling the read-out from the data store 101. The waveform shown at (3) indicates a read-out time or a time interval during which a code is being read out from the data store 101. At a time $t1$ shown at (4), the code read out from the data store 101 is latched by the first latch 102 and delivered on the line 203 for a time interval equal to 7 basic clock pulses. At a time $t2$ shown at (5) the code from the first latch 102 is latched by the second latch 103 and is delivered on the conductor 204 for a time interval equal to seven basic clock pulses. The waveform shown at (6) indicates the enlargement code identification output signal. At a time $t3$ the output from the first latch 102 is detected as being the enlargement code. The output from the selector 104 is shown at (7), the output being initiated at a time $t4$ and delivered for a time interval equal to seven basic clock pulses. When the discriminator 108 detects the enlargement code, the selector 104 selects the first latch 102 to deliver its content to the character generator 105 for a time interval equal to seven basic clock pulses, but when the discriminator 108 does not detect the enlargement code, the selector 104 selects the second latch 103 to have its content delivered to the character generator 105 for a time interval equal to a seven basic clock pulse interval as described in detail hereinbefore. The character pattern signals appear on the output lines 206-1 through 206-7 for a time interval as shown at (8). The hatched area indicates a time delay or lag between the input of the character code to the character generator 105 and the output of the pattern signals. The load signal is applied to the shift register 106 as indicated at (9). The load signal P5 succeeding to the load pulse signal P4 is indicated by dotted lines because this signal is not generated by the load signal converter 110-2 in the manner described in detail above. The shift pulses are applied to the shift registers as shown at (10). It is seen that after the detection of the enlargement code the frequency of the shift pulses is stepped down to ½ by the clock converter 110-1 in the manner described above, the stepped-down pulses repeating for a time interval equal to 14 basic clock pulses.

As described above, according to the present invention only a desired character may be enlarged to a desired size. In addition, the positions of the characters in a predetermined size and the enlarged characters may be freely selected as shown in FIG. 6 in a very simple fashion.

The signal converter in accordance with the present invention may be applied to all of recording and display devices of the type generating character patterns by a raster scanning system or by the combination of dots.

In the first embodiment, the character pattern field has been shown as being divided by an even number (12) rows, but it will be understood that it may be divided by an odd-number rows. In the latter case, the divider 113 is so arranged that it will not deliver a decimal fraction on the conductor 113-1, but deliver a quotient including a fraction on the conductor 224. The constant adder 114 is so arranged as to add a constant $(N-1)/2$ where $N=$ an odd integer to the output from the divider 113 and to deliver on the conductor 225 the sum excluding a fraction. In this manner, the character pattern divided by an odd number of rows may be equally enlarged.

Figure 13:
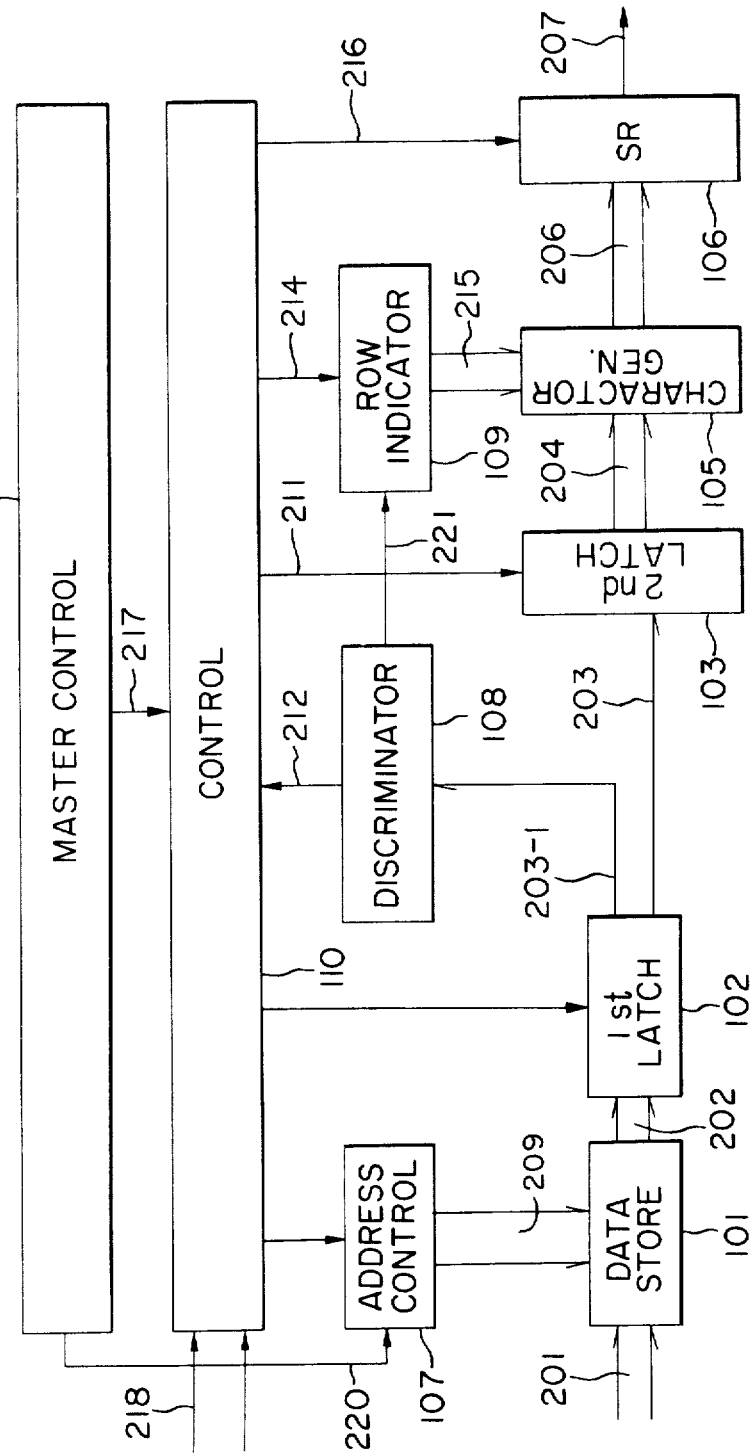
FIG. 13 is a block diagram of a first modification of the first embodiment.

Instead of the enlargement codes :31 and :32, any suitable codes may be used as required. Instead of placing these enlargement codes in front of a character code which must be enlarged as shown in FIG. 7, they may be placed behind a character code to be enlarged as shown in FIG. 8. To this end, the signal converter may be modified as shown in FIG. 13. The output from the first latch 102 is delivered through a conductor 203-1 to the discriminator 108 so that the enlargement code may be delivered without any delay as an output from the second latch 103 and consequently the selector 104 in the first embodiment may be eliminated. Except for this change, the modification shown in FIG. 13 is substantially similar in construction to the first embodiment shown in FIG. 10.

Figures 14, 15:
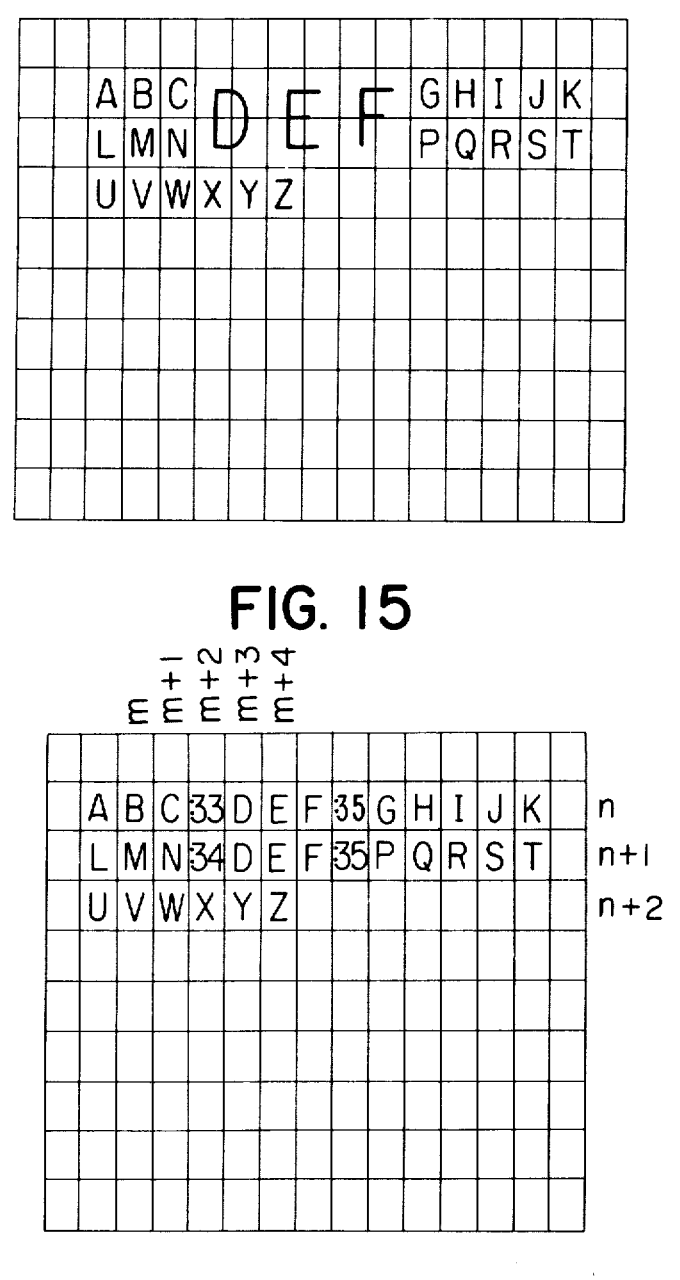

When enlarged characters appear successively as shown in FIG. 14, it would be a very tedious operation to place the enlargement codes in front of or behind every character to be enlarged. To solve this problem, a coding system may be used wherein the characters succeeding the enlargement codes may be enlarged until an inhibit code or signal appears. This will be described in detail with reference to FIG. 15. The characters D, E and F succeeding the enlargement code :33 are all enlarged in their upper halves while those succeeding the enlargement code :34 are all enlarged in their lower halves. When the inhibit code :35 appears, the enlargement of the characters succeeding it is presented.

With the coding system described above, the delay circuit 110-6 and the hold circuit 110-10 in the control 110 are eliminated and instead flip-flops are provided which are set in response to the detection of the enlargement initiation code :33 or :34 and is reset in response to the detection of the enlargement inhibit code :35. Instead of a particular enlargement inhibit code, an even-numbered section may be indicated by a specific code just appeared.

So far the first embodiment has been described as doubling the size of a character both lengthwise and widthwise, but it is to be understood to those skilled in the art that the present invention is not limited thereto and that the present invention may be applied equally in enlarging to any size, such as three times, four times and so on. To this end, a character pattern field is divided into a plurality of rows which are further divided equally by a desired magnification and the enlargement codes are placed in suitable rows. Theoretically speaking, a character may be enlarged both lengthwise and widthwise by a magnification equal to the number of rows of the character pattern field. Furthermore, if the enlargement codes are placed in two or more lines, enlargement to infinity becomes possible.

The underlying principle of the present invention may be equally applied to the reduction of a character to such an extent which is dependent upon the resolution. To this end, a reduction code is used to designate the position of a character to be reduced in one line. For instance, assume that a character is to be reduced by (½). Then the reduction code is used to designate whether the reduced character should be placed in the upper or lower half section of one line. The rows must be alternately read out, and the speed at which the bit patterns in each row are read must be doubled.

So far the present invention has been described as utilizing the character generator of the type forming a character pattern with an array of 12 × 7 dots, but it will be understood to those skilled in the art that a larger character generator with an array of say 24 × 14 dots may be used. According to the first embodiment and its modification described above, in response to the detection of the enlargement code by the discriminator 108, whether the upper or lower half of a character pattern field should be enlarged is decided. That is, in response to the output from the discriminator, the pattern signals corresponding to the upper or lower half section are read out from the character generator. Therefore it is not required to slow down the loading speed of the shift register when a character is to be enlarged. As a result, the clock converter 110-1 shown in FIGS. 10 or 13 may be eliminated, and the basic clock pulses are applied to the shift register 106 as shift pulses.

Figure 16:
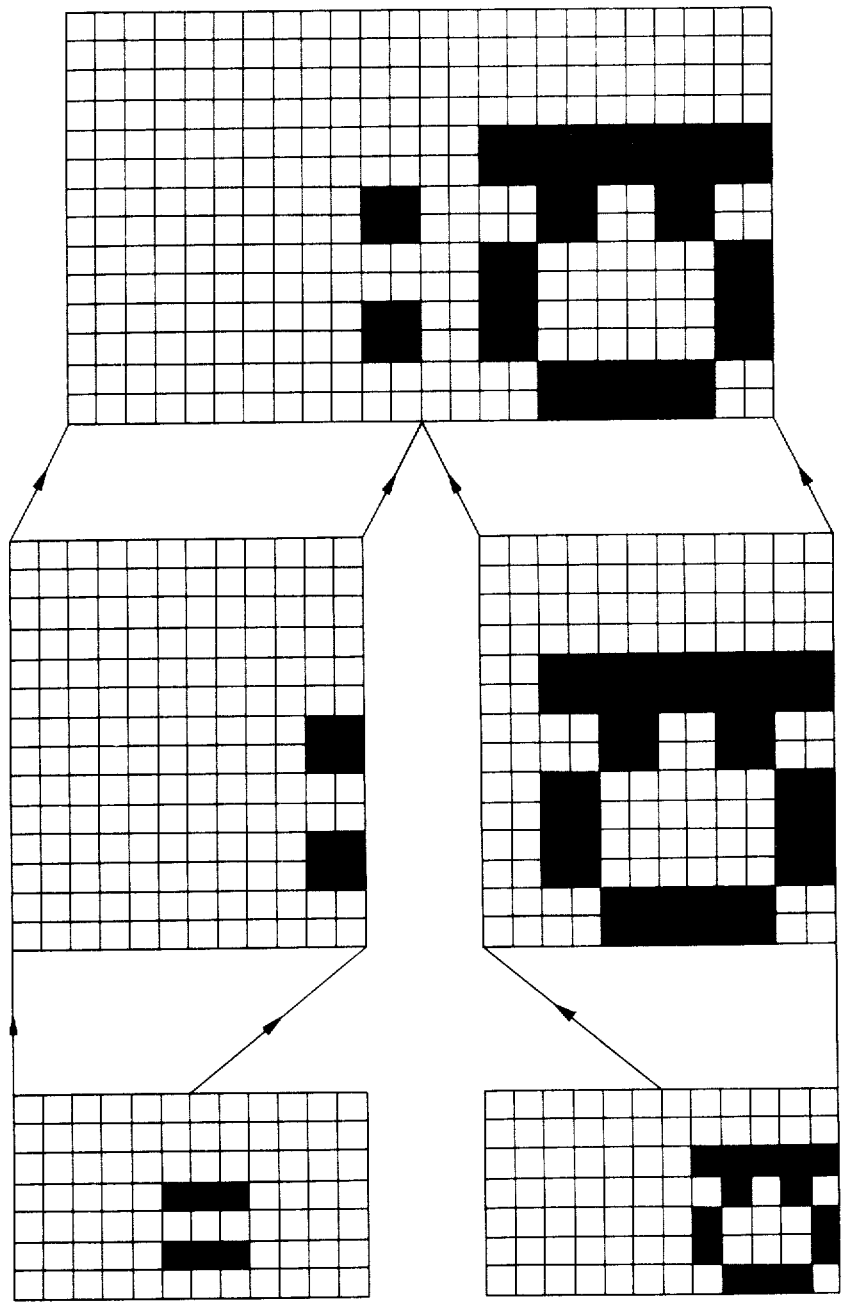
FIG. 16 is a view used for the explanation of the enlargement of specified parts of different characters and the combination therewith in accordance with the present invention.

According to the present invention, not only the whole character may be enlarged but also the upper and lower halves of different characters may be enlarged and combined as shown in FIG. 16. As described in detail hereinbefore, according to the present invention two types of enlargement codes are used, one for enlarging the upper half while the other for enlarging the lower half independently of each other. Therefore, it may be so coded that the upper half of a desired character may be enlarged in one line while the lower half of another character may be enlarged in the succeeding line and the enlarged upper and lower halves may be combined as shown in FIG. 16. In like manner, various combinations are possible. For instance, the enlarged upper halves or lower halves may be combined so that any special signs and marks may be recorded.

Figure 17:
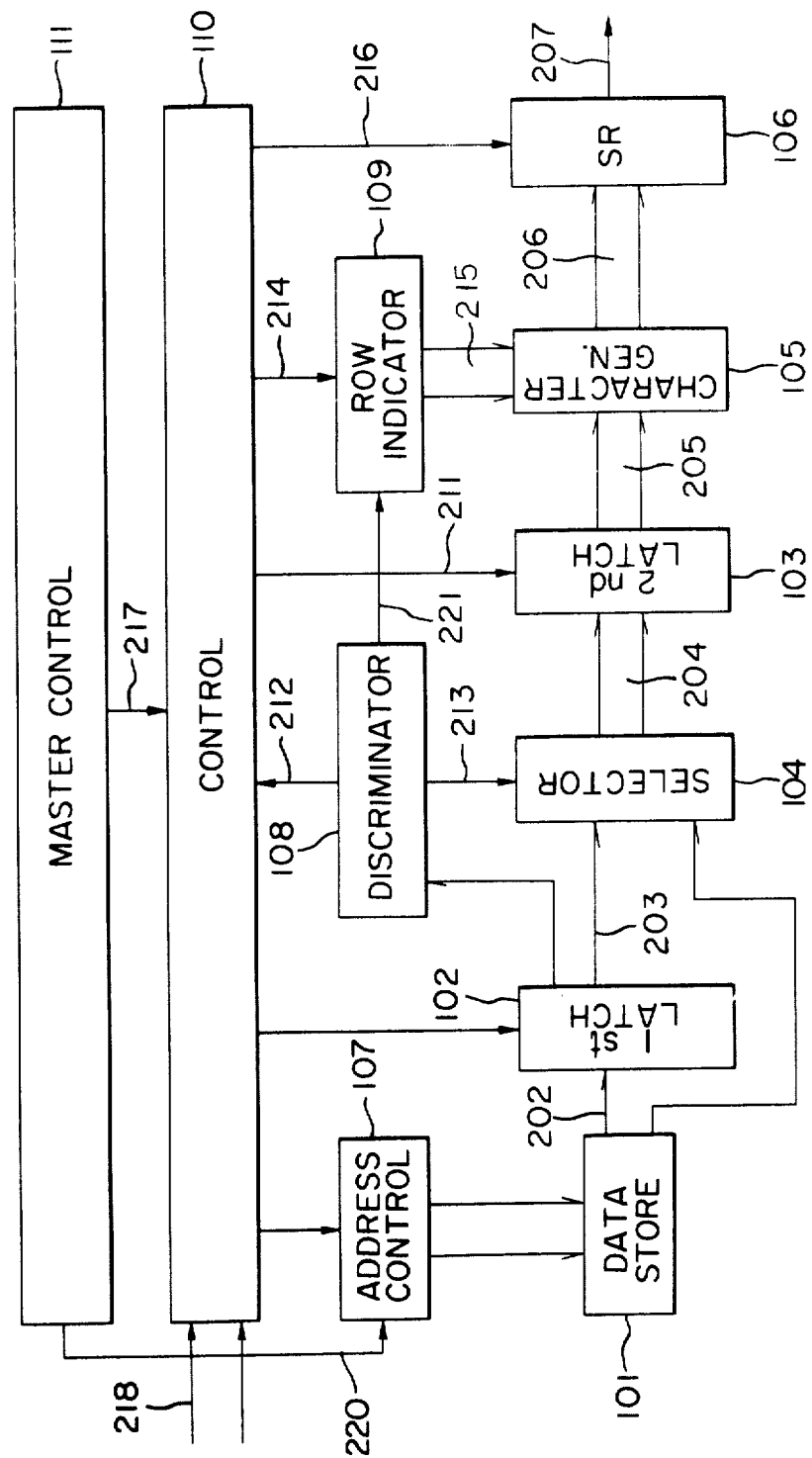
FIG. 17 is a block diagram of a second modification of the first embodiment shown in FIG. 10.

Modification, FIG. 17

A modification shown in FIG. 17 is substantially similar in construction to the first embodiment shown in FIG. 10 except that the selector 104 and the second latch 103 are repositioned and that the output from the first latch 102 is delivered to the discriminator 108 and to the selector 104.

The mode of operation is also substantially similar to that of the first embodiment described in detail above in conjunction with FIG. 10. Upon detection of the enlargement code in the first latch 102 by the discriminator 108, the selector 104 operates to transfer the output from the data store 101 into the second latch 103. On the other hand, when no enlargement code is detected, the selector 104 operates to transfer the content in the first latch 102 into the second latch 103. Other operations are similar to those of the first embodiment so that no further description shall be made in this specification.

So far the data store 101 shown in FIGS. 10, 13 and 17 has been described as being adapted to receive the data of one page, but it will be understood to those skilled in the art that it may receive and store the data of many pages or even one line or character.

What we claim is:
1. A character size changing device comprising:
  (a) pattern signal output means responsive to an input information signal for developing pattern signals;
  (b) pattern output means responsive to the pattern signals developed from said pattern signal output means for producing visible character patterns;
  (c) storage means for storing therein information signals to be applied to said pattern signal output means and instruction signals for designating a part of the visible patterns to be produced by said pattern output means and specifying the size of the visible patterns;
  (d) read-out means for reading out information and instruction signals stored in said storage means;
  (e) transmission means for transmitting the information signals read out from said storage means to said pattern signal output means;
  (f) discrimination means for discriminating the presence of an instruction signal in the signals read out from said storage means; and
  (g) control means for controlling said pattern signal output means to cause, when no instruction signal is discriminated by said discrimination means, said pattern signal output means to develop all the pattern signals corresponding to a read-out information signal and to cause, upon detection of a read-out instruction signal, the pattern signal output means to develop a part of the pattern signals corresponding to the part of the visible pattern designated by the discriminated instruction signal.

2. A character size changing device as set forth in claim 1, wherein the visible patterns are formed in rows and columns and wherein, in order to vary the size of a pattern, said storage means stores the same information signal in its storage areas corresponding to adjacent rows of one column and the instruction signals for the information signals in its storage areas corresponding to the adjacent rows in the adjacent column.

3. A character size changing device as set forth in claim 1, wherein said instruction signals consist of a first instruction signal designating that part of the pattern signals corresponding to an information signal for producing the upper half of a character pattern and a second instruction signal designating that part of the pattern signals for producing the lower half of a character pattern.

4. A character size changing device comprising:
  (a) pattern signal output means responsive to an information signal and a row indication signal for developing pattern signals corresponding to the rows designated by the row indication signal for the pattern signals corresponding to the information signal;
  (b) pattern output means responsive to the pattern signals developed from said pattern signal output means for producing visible character patterns;
  (c) storage means for storing therein the information signals to be applied to said pattern signal output means and instruction signals designating a part of the visible patterns to be produced by said pattern output means and specifying the size of the visible patterns;
  (d) read-out means for reading out the information and instruction signals stored in said storage means;
  (e) delivery means for delivering the information signals read out from said storage means to said pattern signal output means;

(f) discrimination means for discriminating the presence of an instruction signal in the signals read out from said storage means to produce an output signal; and (g) control means including row indication signal generating means for generating row indication signals, said control means causing said row indication signal generating means to generate a row indication signal designating one row when said discrimination means discriminates the presence of an instruction signal in the signals read out from said storage means, and said control means causing said row indication signal generating means to generate a row indication signal designating another row when said discrimination means discriminates the absence of an instruction signal in the signals read out from said storage means.

5. A character size changing device as set forth in claim 4, wherein the visible patterns are formed in rows and columns and wherein, in order to vary the size of a character pattern, said storage means stores the same information signal in its storage areas corresponding to the adjacent rows of one column and the instruction signals for the information signals in its storage areas corresponding to the adjacent rows in the adjacent column.

6. A character size changing device as set forth in claim 4, wherein said instruction signals consist of a first instruction signal designating that part of the pattern signals corresponding to the information signal for producing the upper half of a character pattern and a second instruction signal designating that part of the pattern signals for producing the lower half of a character pattern.

7. A character size changing device as set forth in claim 6, wherein said row indication signal generating means comprises:
first row indication signal generating means for generating a row indication signal output;
first operation means to which is applied the output from said first row indication signal generating means for producing a first operated output;
second operation means to which is applied the output from said first operation means for producing a second operated output; and
selection means responsive to the output signal from said discrimination means for selecting either one of the outputs from said first row indication signal generating means, said first operation means and said second operation means.

8. A character size changing device as set forth in claim 7, wherein said selection means selects the output from said first operation means in response to the discrimination by said discrimination means of an instruction signal designating the pattern signals for producing the upper half of a character pattern.

9. A character size changing device as set forth in claim 7, wherein said selection means selects the output from said second operation means in response to the discrimination by said discrimination means of an instruction signal designating the pattern signals for producing the lower half of a character pattern.

10. A character size changing device as set forth in claim 4, wherein said pattern signal output means comprises:
pattern signal generating means responsive to the row indication signal and the information signal applied thereto for developing in parallel the pattern signals designated by said row indication signal for the pattern signals corresponding to an information signal; and
parallel-serial conversion means for converting the parallel pattern signals into serial pattern signals.

11. A character size changing device as set forth in claim 4, wherein said row indication signal generating means comprises:
first row indication signal generating means for generating a row indication signal output;
operation means to which is applied the output from said first row indication signal generating means for producing an operated output; and
selection means for selecting either one of the outputs from said first row indication signal generating means and said operation means;
wherein said selection means selects the output from said operation means in response to the discrimination of an instruction signal by said discrimination means and wherein said selection means selects the output from said first row indication signal means when no instruction signal is discriminated by said discrimination means.

12. A character size changing device comprising:
(a) storage means for storing therein information signals and instruction signals designating a part of the information signal to be developed;
(b) read-out means for reading out the information and instruction signals stored in said storage means;
(c) pattern signal generating means responsive to an information signal read out from said read-out means for generating pattern signals corresponding to said read out information signal and delivering a sequence of the pattern signals in response to read-out pulses applied thereto;
(d) pattern output means responsive to the pattern signals developed from said pattern signal generating means for producing visible character patterns;
(e) delivery means for delivering the information signals read out from said storage means to said pattern signal generating means;
(f) discrimination means for discriminating the presence of an instruction signal in the signals read out from said storage means;
(g) pulse generating means for generating the read-out pulses in response to which the pattern signals are read out sequentially from said pattern generating means; and
(h) control means for controlling said pulse generating means to cause, when the presence of an instruction signal is not discriminated by said discrimination means, said pulse generating means to generate read-out pulses of a first frequency and to cause, when the presence of an instruction signal is discriminated by said discrimination means, said pulse generating means to generate second read-out pulses of a second frequency different from said first frequency.

13. A character size changing device as set forth in claim 12, wherein said first frequency is higher than said second frequency.

14. A character size changing device as set forth in claim 12, wherein the visible patterns are formed in rows and columns and wherein, in order to vary the size of a pattern, said storage means stores the same information signal in the storage areas corresponding to the adjacent rows of one column and the instruction signals for the information signals in its storage areas corresponding to the adjacent rows in the adjacent column.

15. A character size changing device as set forth in claim 12, wherein said instruction signals consist of a first instruction signal designating that part of the pattern signals of the information signal for producing the upper half of a character pattern and a second instruction signal designating that part of the pattern signals for producing the lower half of a character pattern.

16. A character size changing device as set forth in claim 15, wherein said first frequency is twice as high as said second frequency.

17. A character size changing device comprising:
   (a) signal storage means for storing signals comprising
      (i) a store for storing therein information signals and instruction signals for designating modes of output of the information signals;
      (ii) read-out means for reading out the information and instruction signals stored in said store,
      (iii) first holding means for holding for a predetermined period of time the signals read out from said store at a predetermined time intervals $t$, and
      (iv) second holding means for reading out the signals held in said first holding means to hold for a further predetermined period of time the signals read out from said first holding means;
   (b) discrimination means for discriminating whether one of said first and second holding means holds an instruction signal or not;
   (c) pattern signal output means responsive to an information signal held in one of said first and second holding means for generating pattern signals corresponding to the held information signal;
   (d) pattern output means responsive to the pattern signals generated from said pattern signal output means for producing visible character patterns; and
   (e) control means for controlling said pattern signal output means to cause, when an instruction signal held in one of said first and second holding means is discriminated by said discrimination means, said pattern signal output means to generate pattern signals for an interval of $2t$ and to cause, when no instruction signal is discriminated in said first and second holding means, said pattern signal output means to generate the pattern signals for an interval of $t$.

18. A character size changing device as set forth in claim 17, wherein the visible patterns are formed in rows and columns and wherein, in order to vary the size of a pattern, said storage means stores the same information signal in its storage areas corresponding to the adjacent rows of one column and the instruction signals for the information signals in its storage areas corresponding to the adjacent rows in the adjacent column.

19. A character size changing device as set forth in claim 17, wherein said instruction signals consist of a first instruction signal designating that part of the pattern signals corresponding to an information signal for producing the upper half of a character pattern and a second instruction signal designating that part of the pattern signals for producing the lower half of a character pattern.

20. A character size changing device as set forth in claim 17, further comprising a selector for selecting either one of the signals from said first holding means and from said second holding means for transmission to said pattern signal output means, said discrimination means discriminating whether said second holding means holds an instruction signal or not, said selector being responsive to the discrimination of an instruction signal by said discrimination means to cause the signal from said first holding means to be delivered to said pattern signal output means when no instruction signal is discriminated by said discrimination means.

21. A character size changing device as set forth in claim 17, wherein said discrimination means discriminates whether an instruction signal is held in said first holding means or not.

22. A character size changing device as set forth in claim 17, wherein said control means includes a first control means for causing said pattern signal output means to generate pattern signals corresponding to the information signals designated by the instruction signal for a period when said instruction signal is being applied to said pattern signal output means.

23. A character size changing device as set forth in claim 17, wherein said pattern signal output means comprises:
   pattern signal generating means responsive to an information signal applied thereto for generating pattern signals in parallel; and
   parallel-serial conversion means for converting the parallel pattern signals into serial pattern signals.

* * * * *

UNITED STATES PATENT OFFICE
CERTIFICATE OF CORRECTION

Patent No. 4,107,786     Dated  August 15, 1978

Inventor(s) KATSUMI MASAKI ET AL

It is certified that error appears in the above-identified patent and that said Letters Patent are hereby corrected as shown below:

Column 1, line 19, "insufficient" should read --efficient--;

Column 3, line 15, insert --direction-- after "widthwise";

Column 3, line 47, "servometer" should read --servomotor--;

Column 4, line 50, "This is" should read --That is--;

Column 5, line 7, "enlarged" should read --doubled in size--;

Column 6, line 26, "102" should read --202--;

Column 6, line 27, "202" should read --102--;

Column 7, lines 8 and 9, "conductor" should read --conductors--;

Column 10, line 27, "rows" should read --row--;

Column 12, lines 41 and 42, "present" should read --prevented--;

Column 13, line 4, insert --one half-- before "(1/2)".

Signed and Sealed this

Sixth Day of March 1979

[SEAL]

Attest:

RUTH C. MASON
*Attesting Officer*

DONALD W. BANNER
*Commissioner of Patents and Trademarks*